US006554989B2

(12) United States Patent
Muramoto et al.

(10) Patent No.: US 6,554,989 B2
(45) Date of Patent: Apr. 29, 2003

(54) METHOD OF FORMING MULTILAYER COATING FILMS AND MULTILAYER COATING FILMS

(75) Inventors: Hisaichi Muramoto, Kobe (JP); Takashi Kuniyoshi, Katano (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/983,727

(22) Filed: Oct. 25, 2001

(65) Prior Publication Data

US 2002/0121442 A1 Sep. 5, 2002

(30) Foreign Application Priority Data

Oct. 26, 2000 (JP) ........................................ 2000-326504

(51) Int. Cl.$^7$ .............................................. C25D 13/10
(52) U.S. Cl. ...................................... 204/488; 204/486
(58) Field of Search ................................... 204/488, 486

(56) References Cited

U.S. PATENT DOCUMENTS 6,334,940 B1 * 1/2002 Muramoto et al. ......... 204/488

FOREIGN PATENT DOCUMENTS

EP 0259181 A2 * 9/1988

* cited by examiner

*Primary Examiner*—Kishor Mayekar
(74) *Attorney, Agent, or Firm*—Sughrue Mion, PLLC

(57) ABSTRACT

The present invention provides a method of forming a multilayer coating film comprising the step (I) of coating an article to be coated with an electrodeposition coating containing two resin components incompatible with each other followed by curing by heating to form an electrodeposited coating film, the step (II) of applying a water-borne intermediate coating onto the electrodeposited coating film to form an uncured intermediate coating film, the step (III) of applying a water-borne base coating onto the intermediate coating film to form an uncured base coating film, the step (IV) of applying a clear coating onto the base coating film to form an uncured clear coating film and the step (V) of curing the intermediate coating film, the base coating film and the clear coating film simultaneously by heating to thereby obtain a multilayer coating film.

6 Claims, No Drawings

METHOD OF FORMING MULTILAYER COATING FILMS AND MULTILAYER COATING FILMS

TECHNICAL FIELD

The present invention relates to a method of forming a multilayer coating film utilizing a three-wet coating system which comprises applying a water-borne intermediate coating, a water-borne base coating and a clear coating, in that order, onto an electrodeposited coating film formed on an article to be coated in the wet-on-wet manner and curing simultaneously by heating. More specifically, it relates to a method of forming a multilayer coating film by which the multilayer coating film excellent in chipping resistance can be obtained, and to a multilayer coating film obtained by that method.

BACKGROUND ART

In recent years it has been urgently demanded that the coating process be curtailed in the field of coatings, in particular in the field of automobile coatings, so that the problems of saving resources, reducing costs and minimizing environmental impacts (VOC and HAPs, etc.) may be solved. In the conventional procedure for finishing coating automobiles, the three-coat three-bake coating technique has been used, namely the electrodeposited coating film, intermediate coating film and top coating film are baked each time after application of each corresponding coating. In recent years, however, it has been demanded that those coating film performance characteristics which can be exhibited by the three-coat films obtained by the conventional three-coat three-bake coating technique be acquired by employing the three-wet coating system according to which the three coating steps, namely intermediate coating, base coating and clear coating, are carried out in the wet-on-wet manner following the step of electrodeposition coating and baking of the electrodeposited coating film and the resulting wet coating films are baked simultaneously, while thereby reducing the number of baking process steps.

Among the coating film performance characteristics referred to above, the shock resistance, in particular the so-called chipping resistance to collision of pebbles or like obstacles with the car body during running, can be secured by the conventional three-coat three-bake coating technique, for example by providing a particular intermediate coating film having chipping resistance. In the three-wet coating system mentioned above, however, the conventional intermediate coatings cannot be used since the coating films obtained tend to be impaired in appearance due to such troubles as blurring or layer inversion. The coating films obtained by the three-wet coating system are disadvantageous in that they are low in shock resistance and chipping resistance.

Japanese Kokai Publication Sho-62-65765 discloses a technique according to which a resin layer capable of absorbing a shock to coating films (the so-called anti-chipping primer layer) is provided during multilayer coating film formation, in particular between the electrodeposited coating film and intermediate coating film. However, further incorporation of such a step in the car body coating process is against the market needs for curtailment of the process and for cost saving mentioned above.

Accordingly, it is an object of the present invention to provide a method of forming a multilayer coating film by which the multilayer coating film comparable in shock resistance, in particular chipping resistance, to the conventional three-coat films can be formed in the three-wet one-bake coating system which is intended for coating process curtailment, cost reduction and environmental impact reduction.

SUMMARY OF THE INVENTION

The present invention provides a method of forming a multilayer coating film comprising the step (I) of coating an article to be coated with an electrodeposition coating followed by curing by heating to form an electrodeposited coating film, the step (II) of applying a water-borne intermediate coating onto said electrodeposited coating film to form an uncured intermediate coating film, the step (III) of applying a water-borne base coating onto said intermediate coating film to form an uncured base coating film, the step (IV) of applying a clear coating onto said base coating film to form an uncured clear coating film and the step (V) of curing said intermediate coating film, said base coating film and said clear coating film simultaneously by heating to thereby obtain a multilayer coating film, wherein said electrodeposition coating contains a particle A containing a resin (a) whose solubility parameter is δa as well as a particle B containing a curing agent and a resin (b) whose solubility parameter is δb and satisfies that (1) the value of (δb−δa) is not less than 1.0, (2) as regards the electrodeposited coating film formed from said electrodeposition coating, the resin film formed from said particle A shows a dynamic glass transition temperature of −110 to 10° C. and the coating film obtained by film formation from said particle A alone shows an elongation percentage of not less than 200% and (3) as regards the electrodeposited coating film formed from said electrodeposition coating, the resin film formed from said particle B shows a dynamic glass transition temperature of 60 to 150° C., and wherein said water-borne intermediate coating contains an elastomer.

The invention is also directed to a multilayer coating film which is obtained by the above-mentioned method of forming a multilayer coating film.

DISCLOSURE OF THE INVENTION

The method of forming a multilayer coating film according to the present invention comprises the step (I) of coating an article to be coated with an electrodeposition coating followed by curing by heating to form an electrodeposited coating film, the step (II) of applying a water-borne intermediate coating onto the above electrodeposited coating film to form an uncured intermediate coating film, the step (III) of applying a water-borne base coating onto the intermediate coating film to form an uncured base coating film, the step (IV) of applying a clear coating onto the above base coating film to form an uncured clear coating film and the step (V) of curing the above intermediate coating film, the above base coating film and the above clear coating film simultaneously by heating to thereby obtain a multilayer coating film.

Step (I)

In the method of forming a multilayer coating film according to the invention, the above step (1) comprises applying an electrodeposition coating on an article to be coated, followed by curing by heating to form an electrodeposited coating film.

Electrodeposition Coating

The above electrodeposition coating contains a particle A containing a resin (a) whose solubility parameter is δa as well as a particle B containing a curing agent and a resin (b) whose solubility parameter is δb and in which (1) the value of (δb−δa) is not less than 1.0, (2) as regards the electrodeposited coating film formed from the above electrodeposition coating, the resin film formed from the above particle A shows a dynamic glass transition temperature of −110 to 10° C., and the coating film obtained by film formation from the above particle A alone shows an elongation percentage of not less than 200%, and (3) as regards the electrodeposited coating film formed from the above electrodeposition coating, the resin film formed from the above particle B shows a dynamic glass transition temperature of 60 to 150° C.

The above electrodeposition coating, in which two resin components incompatible with each other are used, can form an electrodeposited coating film having a multilayer structure so that a resin layer having corrosion resistance may be formed on the side in contact with the article to be coated and a resin layer having shock resistance (chipping resistance) on the side in contact with air to thereby attain high levels of corrosion resistance and shock resistance simultaneously.

The above electrodeposition coating contains a particle A containing a resin (a) whose solubility parameter is δa as well as a particle B containing a curing agent and a resin (b) whose solubility parameter is δb. In the present specification, it is meant that particles A and particles B are prepared in the form of separate emulsions and are mixed up in preparing the electrodeposition coating but occur as separate particles in the coating without being fused together.

In the above electrodeposition coating, the difference (δb−δa) between the solubility parameter δa of the above resin (a) and the solubility parameter δb of the above resin (b), is not less than 1.0. By selecting two incompatible or hardly compatible resin components such that the value of (δb−δa) is not less than 1.0, it becomes possible to form electrodeposited coating films having a multilayer structure.

It is generally considered that when the difference in solubility parameter between resins is 0.5 or more, the compatibility between them is lost and the coating films show a structure reflecting phase separation. In the case of the above electrodeposition coating, however, it is necessary that a coating film structure showing distinct layer separation be formed and, therefore, it is necessary that the difference in solubility parameter be at least 1.0 or more. If the difference is less than 1.0, any coating film structure showing distinct layer separation will not be formed in the step of electrodeposition coating, hence the levels of shock resistance, in particular chipping resistance, and corrosion resistance which are attainable simultaneously will be unsatisfactory.

The above-mentioned solubility parameter δ is generally called SP (solubility parameter) and is an index of the hydrophilicity or hydrophobicity of a resin and serves as an important index in estimating the compatibility between resins. The above solubility parameter can be expressed numerically based on the hitherto-known technique of turbidimetry measurement by skilled in the art (K. W. Suh, D. H. Clarke, J. Polymer. Sci., A-1, 5, 1671 (1967)).

Among the above resins (a) and (b), the one having a higher solubility parameter, namely resin (b), is higher in affinity for the electroconductive substrate surface such as a metal, which is higher in surface polarity, so that the electrodeposited coating film formed from particles B containing the resin (b) is formed on the side contacting the conductive substrate made of a metal or like material in the step of curing by heating. On the other hand, the particles A containing resin (a) migrate toward the air-contacting side to form another resin layer. Thus, the difference in solubility parameter between the two resins is considered to serve as a driving force for causing resin layer separation.

The state of the above resin layer separation can be confirmed by visual observation of a section of the electrodeposited coating film by means of a video microscope or observation under a scanning electron microscope (SEM observation). For identifying the resin components constituting the respective resin layers, a total reflection Fourier transform infrared photometer (FTIR-ATR), for instance, can be used.

Of the electrodeposited coating film formed from the above electrodeposition coating, the resin film formed from the particles A containing resin (a) mentioned above shows a dynamic glass transition temperature of −110 to 10° C. If it is above 10° C., the coating film obtained from particles A will be poor in flexibility or shock resistance. If it is below −110° C., it is difficult in practice to prepare. Preferred is −100to −30° C.

The above-mentioned dynamic glass transition temperature can be measured by using a dynamic viscoelasticity measuring apparatus such as Rheovibron (product of Orientec) or a Rheometrics dynamic analyzer (product of Rheometrics) following electrodeposition coating of a substrate with the above electrodeposition coating, curing and peeling of the electrodeposited coating film using mercury.

As regards the particles A containing resin (a) mentioned above, the coating film obtained by film formation from the particles A alone shows an elongation percentage of not less than 200%. When it is less than 200%, the coating films obtained become poor in elasticity. Preferably, it is not less than 500%. The above elongation percentage can be determined according to JIS K 6301.

The above resin (a) is not particularly restricted on condition that the above characteristics requirements are satisfied. Thus, it includes, for example, homopolymers of a conjugated diene monomer such as butadiene, isoprene or chloroprene, or random or block copolymers of a conjugated diene monomer and such a monomer as ethylene, propylene, ethylidene, norbornene, dicyclopentadiene, 1,4-hexadiene, vinyl acetate, vinyl chloride, styrene, acrylonitrile, isobutylene or (meth)acrylic acid (ester); polyurethane-based thermoplastic elastomers synthesized by polyaddition reaction of a diisocyanate and a diol; polyester-based thermoplastic elastomers synthesized by transesterification and polycondensation reactions using dimethyl terephthalate, 1,4-butanediol, poly(tetramethylene) glycol, etc. as raw materials; and polyamide-based thermoplastic elastomers synthesized by transesterification and polycondensation reactions using a lactam, a dicarboxylic acid and polyether diol as raw materials.

In the above electrodeposition coating, the above resin (a) is preferably an elastomer (rubber) produced by polymerizing a monomer component comprising at least 50% by weight of a conjugated diene monomer in view of the possible shock resistance manifestation level, economy (cost) and general versatility. If the diene content is less than 50% by weight, it will become difficult to constitute a resin layer showing the above glass transition temperature and elongation percentage in the step of coating film formation and, as a result, the shock resistance and chipping resistance will decrease. An elastomer produced by polymerizing a monomer component comprising not less than 60% by weight of a conjugated diene monomer is preferred and not less than 65% is more preferred.

The molecule of the above resin (a) may contain, within the molecular structure and/or at a terminus thereof, a reactive group or polar group such as a hydroxyl, amino, vinyl, carboxyl, urethane or urea group. The above reactive group or polar group can be introduced by copolymerizing a monomer component comprising a reactive or polar group-containing monomer in the step of preparing a resin (a) or by a method known in the art into a resin (a) obtained by copolymerization.

The above copolymerization is preferably carried out in the presence of a radical polymerization initiator. As the radical polymerization initiator, there may be mentioned, for example, azo initiators such as 2,2'-azobisisobutyronitrile and 2,2'-azobis(2,4-dimethylvaleronitrile); and peroxide initiators such as benzoyl peroxide, lauryl peroxide and tert-butyl peroctoate. These initiators are used in an amount of 0.2 to 10 parts by weight, preferably 0.5 to 5 part by weight, per 100 parts by weight of polymerizable monomers in total.

When the above resin (a) is an oligomer (liquid rubber) having a number average molecular weight less than 10,000, the resin is highly sticky and, as such, has low shock resistance performance characteristics, so that it is necessary to subject the same to curing reaction in the step of coating film formation in order to express the desired coating film performance characteristics, such as shock resistance. In that case, it is preferred that hydroxyl groups are contained so as to give a hydroxyl value within the range of 20 to 200. At a hydroxyl value less than 20, the coating film may fail to be cured to a sufficient extent, hence fail to express satisfactory rubber performance characteristics such as sufficient elongation percentage. If it is above 200, excess hydroxyl groups remain in the coating film after curing, hence the water resistance may decrease. Furthermore, the hardness of the cured coating film increases, leading to failure to express a sufficient level of elongation percentage.

When the above resin (a) has a high number average molecular weight not less than 10,000, if it has little stickiness without curing and shows sufficient shock resistance performance characteristics, a curing reaction is not particularly required in the step of coating film formation. In such cases, it is not necessary to provide the resin structure with reactive groups or polar groups in advance.

The molecular weight of the above resin (a) is not particularly restricted but preferably is within the range of 1,000 to 200,000 in terms of number average molecular weight. If it is less than 1,000, it will be difficult to obtain coating films showing an elongation percentage exceeding 200% even when the crosslinking reaction is effectively carried out in the step of coating film formation. If it exceeds 200,000, the resin solution will become highly viscous so that not only the handling of the obtained resin in such operations as emulsification/dispersion becomes difficult but also film appearance of the electrodeposited coating films obtained may be markedly impaired. Further, in some instances, it becomes difficult, due to the high viscosity, to secure layer separation in the step of baking of coating films.

The above resin (a), when emulsified and dispersed, independently of the resin (b), in an aqueous medium, constitutes the particles A.

The above resin (a) may introduce a cationic group such as an amino group among the above-mentioned reactive or polar groups by a urethane-forming reaction or the like to use the resulting products as they are or self-emulsifiable and dispersible in an aqueous medium by using a neutralizing agent. Or, it is also possible to emulsify or disperse it in an aqueous medium by separately applying a cationic emulsifier. On that occasion, if necessary, an appropriate amount of a curing agent, for instance, maybe added to the resin and emulsified/dispersed together. As the above neutralizing agent, there may be mentioned inorganic acids such as hydrochloric acid, nitric acid and phosphoric acid; and organic acids such as formic acid, acetic acid, lactic acid, sulfamic acid and acetylglycine acid.

In the above electrodeposition coating, the resin (a) is preferably emulsified/dispersed in an aqueous medium using a cationic emulsifier, since the hydrophobicity of the particles A containing resin (a) as a whole then increases and a multilayer structure with a distinct layer separation can be obtained.

The above cationic emulsifier is not particularly restricted but maybe anyone having a cationic group. Preferably, it has a number average molecular weight of 1,000 to 200,000. If it is less than 1,000, the water resistance of coating films may be adversely affected. If it exceeds 200,000, the system will become highly viscous in the step of baking of coating films, so that the layer separation may possibly be inhibited.

For securing the emulsifiability/dispersibility of the above resin (a), the cationic group content of the above cationic emulsifier, namely the content of the amino group, ammonium salt group or sulfonium salt group in the emulsifier, is preferably about 30 to 150 as expressed in terms of amine value equivalent. If it is less than 30, the effect of emulsifying/dispersing the resin (a) will be poor. If it exceeds 150, the water resistance and other properties of coating films may be adversely affected.

The above cationic emulsifier is incorporated preferably in an amount within the range of 10 to 50% by weight on the solid basis relative to 100 parts by weight of the resin (a) on the solid basis. If the amount is less than 10% by weight, the dispersion stability of the emulsion will become poor and if it exceeds 50% by weight, not only the water resistance of coating films will deteriorate but also it will become difficult for such characteristic features owing to resin (a) as shock resistance to be fully expressed.

The above cationic emulsifier can be prepared by providing the main chain of a resin with a cationic group by carrying out an appropriate reaction by a method known in the art. The resin skeleton of the above cationic emulsifier is not particularly restricted but may be an acrylic resin, epoxy resin, liquid rubber (elastomer), polyurethane or polyether, or a modified resin based thereon, for instance.

Those having the above-mentioned acrylic resin as the resin skeleton can be synthesized, for example, by subjecting an acrylic copolymer containing a plurality of epoxy groups within the molecule and an amine to ring opening addition reaction. Thus, a cationic acrylic resin can be obtained by copolymerizing an epoxy group-containing acrylic monomer such as glycidyl (meth)acrylate with another monomer and subjecting all the epoxy groups of the resulting epoxy group-containing acrylic resin to ring opening by reacting with an amine.

The above amine is not particularly restricted but mention may be made of, for example, primary, secondary and tertiary amine acid salts such as butylamine, octylamine, diethylamine, dibutylamine, methylbutylamine, monoethanolamine, diethanolamine, N-methylethanolamine, triethylamine acid salts and N,N-dimethylethanolamine acid salts. Ketimine-blocked primary amino group-containing secondary amines, such as aminoethylethanolamine methyl isobutyl ketimine, may also be used. For causing all epoxy rings to open, it is necessary that these amines be reacted with the epoxy rings at least in an equivalent amount.

The above cationic acrylic resin can also be obtained by a direct synthetic method comprising copolymerizing an amino group-containing acrylic monomer with another monomer. The above amino group-containing acrylic monomer includes N,N-dimethylaminoethyl (meth) acrylate and N,N-di-tert-butylaminoethyl (meth) acrylate, etc.

The other monomer to be copolymerized with the above epoxy group-containing acrylic monomer or amino group-containing acrylic monomer is not particularly restricted but includes, for example, hydroxyl group-containing acrylic monomers, other acrylic monomers and non-acrylic monomers. The hydroxyl group-containing acrylic monomers mentioned above can serve to increase the reactivity in curing, hence are preferably used.

When the resin skeleton is the above-mentioned epoxy resin, a cationic group can be introduced therein by modifying the epoxy groups in the resin in the same manner as mentioned above.

When the resin skeleton is the above-mentioned liquid rubber (elastomer), polyurethane or polyether, a cationic group can be introduced therein by subjecting hydroxyl, carboxyl, epoxy or like groups occurring at the molecular terminus and/or in the middle of the molecular structure to urethane formation reaction or addition reaction of an amine.

The cationic emulsifier mentioned above may have a primary hydroxyl group introduced therein for providing the reactivity in curing or a long-chain alkyl group, such as stearyl, dodecyl or octyl groups, introduced therein for improving the ability to be adsorbed on the above resin (a). These can be introduced by reacting functional groups in the main chain with a hydroxyl group-containing secondary amine or a long-chain alkyl group-containing secondary amine, or by copolymerization using a monomer having such a group.

In the above cationic emulsifier, the above cationic group plays a role as a hydrophilic group. Furthermore, the mutual adsorption with the above resin (a) can be secured by means of the flexible main chain moiety and hydrophobic moieties such as alkyl groups or benzene structures occurring in the cationic emulsifier. The above cationic emulsifier can be dissolved or dispersed as such in an aqueous medium.

The above-mentioned particles A may contain a curing agent.

The above curing agent includes isocyanate curing agents, melamine curing agents and amide curing agents. Preferred are blocked polyisocyanates.

As examples of the polyisocyanates serving as raw materials for the above blocked polyisocyanates, there may be mentioned aliphatic diisocyanates such as hexamethylene diisocyanate, tetramethylene diisocyanate and trimethylhexamethylene diisocyanate; alicyclic polyisocyanates such as isophoronediisocyanate and 4,4'-methylenebis(cyclohexyl isocyanate); aromatic diisocyanates such as 4,4'-diphenylmethanediisocyanate, tolylene diisocyanate and xylylene diisocyanate, and polymers derived from these. The above-mentioned blocked polyisocyanates can be obtained by blocking these with an appropriate blocking agent.

Examples of the blocking agent are monohydric alkyl (or aromatic) alcohols such as n-butanol, n-hexyl alcohol, 2-ethylhexanol, lauryl alcohol, phenolcarbinol and methylphenylcarbinol; cellosolves such as ethylene glycol monohexyl ether and ethylene glycol mono-2-ethylhexyl ether; phenols such as phenol, p-tert-butylphenol and cresol; oximes such as dimethyl ketoxime, methyl ethyl ketoxime, methyl isobutyl ketoxime, methyl amyl ketomixe and cyclohexanone oxime; and lactams such as $\epsilon$-caprolactam and $\gamma$-butyrolactam. Oximes and lactams are preferred from the viewpoint of resin curability since these dissociate at low temperature.

The percentage of blocking with the above blocking agent is preferably 100% so that the storage stability of the coating can be secured.

The above polyisocyanates and blocking agents may respectively be used singly or two or more may be used in combination. A plurality of the resulting blocked polyisocyanates may also be used in combination for the purpose of adjusting the coating film physical properties or the degree of curing.

In curing the resin layer composed of the particles A containing the resin (a) mentioned above in the above step (I), it is preferred that the solubility parameter ($\delta i$) of at least one curing agent such as mentioned above have a value between the solubility parameter $\delta a$ of resin (a) and the solubility parameter $\delta b$ of resin (b), namely satisfy the relation $\delta a < \delta i < \delta b$. This makes it possible for the blocked polyisocyanate to be distributed and dissolved in the respective layers after separation into two layers, whereby the curability of the layer containing resin (a) can be secured and the simultaneous curing of the layer containing resin (b) can be realized, with the result that the interlayer adhesion in the multilayer film can be improved and the multilayer appearance after top coating can further be improved.

Further, as means for promoting distribution and dissolution the blocked polyisocyanate in the resin layer comprising the particles A containing the above resin (a), it is also possible to devise that a blocked polyisocyanate partly having an unblocked isocyanato group be reacted with the hydroxyl group which the above resin (a) contains in advance so that the resin (a) and curing agent can migrate together on the occasion of layer separation involving simultaneous curing of the layer containing resin (a) and the layer containing resin (b).

The mixing ratio of the above blocked polyisocyanate to the resin (a) may vary according to the degree of crosslinking required for the intended use of the cured coating films, but, in view of physical properties of coating films and the applicability for the top coating, it is preferably within the range of 10 to 50% by weight, on the solid basis, relative to 100 parts by weight of the resin (a) on the solid basis. An amount less than 10% by weight will lead to insufficient curing of coating films, hence decreased physical properties of coating films, such as decreased mechanical strength thereof and, in some instances, to a bad appearance resulting from coating film erosion by the thinner of the coating in the step of top coating. An amount exceeding 50% by weight may conversely cause excessive curing, resulting in poor physical properties of coating films, such as poor shock resistance.

In the electrodeposited coating film formed from the above-mentioned electrodeposition coating, the resin layer formed from the particles B containing the above resin (b) has a dynamic glass transition temperature of 60 to 150° C. When it is lower than 60° C., the difference in solubility parameter from that ($\delta a$) of resin (a) cannot be made not less than 1.0 but the film obtained will be poor in corrosion resistance. If it is above 150° C., the coating film obtained will be too hard, allowing cracking in some instances. It is preferably 80 to 140° C. The above dynamic glass transition temperature can be determined according to the method mentioned above.

From the viewpoint of expression of good rust preventing effects on electroconductive substrates, it is preferred that the above resin (b) be a cation-modified epoxy resin.

The above cation-modified epoxy resin can be produced by reacting, for ring opening, the epoxy ring in a starting material resin molecule with an amine such as a primary amine, secondary amine or tertiary amine acid salt. The above starting material resin is preferably a polyphenol polyglycidyl ether type epoxy resin which is the product resulting from the reaction of a polycyclic phenol compound, such as bisphenol A, bisphenol F, bisphenol S, phenol novolak or cresol novolak, with epichlorohydrin. As examples for other starting material resins, there may be mentioned those oxazolidone ring-containing epoxy resins which are described in Japanese Kokai Publication Hei-05-306327. These epoxy resins are obtained by reacting, with epichlorohydrin, a diisocyanate compound or a bisurethane compound obtained by blocking the NCO groups of a diisocyanate compound with a lower alcohol such as methanol or ethanol.

The above starting material resin can be used after chain extension, prior to epoxy ring opening reaction with an amine, by means of a bifunctional polyester polyol, polyether polyol, a bisphenol, a dibasic carboxylic acid or the like. Similarly, prior to epoxy ring opening with an amine, a monohydroxy compound, such as 2-ethylhexanol, nonylphenol, ethylene glycol mono-2-ethylhexyl ether or propylene glycol mono-2-ethylhexyl ether, may be added partially to the epoxy ring for the purpose of adjusting the molecular weight or amine equivalent or improving the thermal flow characteristics.

As the above amine, there may be mentioned those specifically mentioned hereinabove referring the cationic emulsifier.

As for the method of introducing a cationic group into the above epoxy resin, the production method described in Japanese Kokai Publication Hei-11-209663 which comprises modifying the epoxy ring into a sulfonium salt is preferred.

The above cation-modified epoxy resin preferably has a number average molecular weight in the range of 1,500 to 5,000. If it is less than 1,500, physical properties such as the solvent resistance and corrosion resistance of cured coating films may be poor. If it exceeds 5,000, it will become difficult to control the resin solution viscosity, hence to synthesize the resin, and the viscosity of the resin obtained will become high, hence difficult to handle in the step of emulsification/dispersion. Furthermore, in some instances, the flow characteristics will be poor in the step of heating/curing and the coating film appearance may be markedly impaired.

The molecule of the above resin (b) is preferably designed such that the hydroxyl value thereof falls within the range of 50 to 250. If the hydroxyl value is less than 50, the curing of coating films will become insufficient and, if, conversely, it exceeds 250, excess hydroxyl groups will remain in the coating film after curing, whereby the water resistance may decrease.

The particles B containing the resin (b) mentioned above contain a curing agent. The above curing agent is not particularly restricted in kind on condition that the resin component can be cured therewith upon heating and it includes those specifically mentioned herein above. Among them, mention may be made of blocked polyisocyanates, which are suited for use as curing agents for electrodeposited resins. The level of addition of the above curing agent is the same as mentioned hereinabove.

The above resin (b), together with the above curing agent, is emulsified/dispersed as such in water to give an emulsion, or emulsified/dispersed in water to give a cationized emulsion by treatment for neutralization using a sufficient amount of a neutralizing agent to neutralize the amino groups occurring in each resin. In the step of emulsion preparation, it is also possible to use the cationic emulsifier specifically mentioned hereinabove.

The above method of emulsification/dispersion may be the same as mentioned hereinabove.

The above electrodeposition coating can be prepared by mixing up the particles A and particles B obtained in the above manner.

The mixing ratio between the above resin (a) constituting particles A and the above resin (b) constituting particles B is preferably 5/95 to 70/30 by weight on the solid basis. If it is outside the above range, the cured coating film obtained after electrodeposition coating and baking may not have a multilayer structure; the resin used in a higher proportion may form a continuous phase while the resin used in a lower proportion may build up a dispersed phase-forming island structure (or microdomain structure). Even if a layer structure is formed, any one of the layers of the multilayer structure will have an extremely diminished thickness, so that any of the shock resistance (chipping resistance) and corrosion resistance will become very poor, hence it is not preferable. A more preferred range is within 10/90 to 60/40.

The resin layer formed from the above particles A preferably has a dry film thickness of 1 to 20 $\mu$m. If it is less than 1 $\mu$m, the coating film obtained cannot be expected to be satisfactory in shock absorbing capacity. If it exceeds 20 $\mu$m, the surface roughness will increase, hence the coating film appearance is impaired. More preferred is 3 to 15 $\mu$m.

For securing those rust prevention, coating film appearance and hiding power required of the conventional electrodeposited coating films, the resin layer formed by the above particles B preferably has a dry film thickness of 5 to 40 $\mu$m. If it is less than 5 $\mu$m, the corrosion resistance of coating films will be insufficient. If it exceeds 40 $\mu$m, the surface roughness will increase and thus the coating film appearance will be impaired, and the occurrence of coating film defects such as foaming will become remarkable. More preferred is 10 to 30 $\mu$m.

The above electrodeposition coating generally contains a pigment.

The above pigment is not particularly restricted but may be any of those generally used in coatings. Thus, it includes, for example, organic color pigments such as azo chelate pigments, insoluble azo pigments, condensed azo pigments, phthalocyanine pigments, indigo pigments, perinone pigments, perylene pigments, dioxane pigments, quinacridone pigments, isoindolinone pigments and metal complex pigments; inorganic color pigments such as chrome yellow, yellow iron oxide, red iron oxide, carbon black, titanium dioxide and graphite; extender pigments such as calcium carbonate, barium sulfate, kaolin, aluminum silicate (clay) and talc; and rust preventive pigments such as aluminum phosphomolybdate, lead silicate, lead sulfate, zinc chromate and strontium chromate. Particularly important among them as pigments to be contained in the cured multilayer film after electrodeposition coating are carbon black, titanium dioxide, aluminum silicate (clay) and aluminum phosphomolybdate. Titanium dioxide mentioned above is high in hiding power as a color pigment and inexpensive and therefore most suited for use in electrodeposited coating films. The above pigments may be used singly but, generally, a plurality thereof are used according to the intended purpose.

The above pigments can be incorporated in the above electrodeposition coating in appropriate amounts after preliminary preparation of a pigment dispersion paste by dispersing them in a cationic pigment-dispersing resin in general use.

As for the level of addition of the above pigments, the ratio P/V between the whole pigment weight (P) and the weight of all vehicle components other than pigments (V) in the electrodeposition coating is preferably within the range of 1/10 to 1/3. The term "all vehicle components other than pigments" mentioned above means the whole solid components other than the pigments constituting the coating. When the ratio is less than 1/10, the barrier properties of coating films against corrosive factors such as moisture may decrease excessively due to an insufficient pigment content and, as a result, any practical level of corrosion resistance may not be expressed. If it exceeds 1/3, a viscosity increase is caused in the step of curing due to the excessive pigment content, the flow characteristics thus may deteriorate and the coating film appearance may be markedly impaired.

In the above electrodeposition coating, there may be incorporated such additives as a rust inhibitor and a surfactant (antifoaming agent) each in an appropriate amount. As the above rust inhibitor which are soluble in water and easy to use, there may be mentioned, in view of the recent market trend toward exclusion of hazardous heavy metals such as lead, those organic acid salts of zinc, cerium, neodymium, praseodymium and like rare earth metals. For example, zinc acetate, cerium acetate, neodymium acetate and the like can be incorporated in the above particles B in the step of preparation thereof and added to the coating in an appropriate amount in a form included or adsorbed in the resin emulsion.

The above electrodeposition coating is preferably prepared so that the solid concentration is amount to in the range of 15 to 25% by weight. In adjusting the solid concentration, an aqueous medium, for example water alone or a mixture of water and a hydrophilic organic solvent, is used. A small amount of an additive may be incorporated in the electrodeposition coating. As the additives, there may be mentioned, for example, ultraviolet absorbers, antioxidants, surfactants, coating film surface smoothening agents and curing catalysts such as organotin compounds.

Electrodeposited Coating Film Forming Method

The method for electrodeposited coating film formation in the above step (I) comprises the step (1) of applying the above electrodeposition coating to an article to be coated by electrodeposition coating to thereby obtain an electrodeposited coat and the step (2) of curing the thus-obtained electrodeposited coat by heating to thereby obtain an electrodeposited multilayer coating film.

Generally, the electrodeposition coating in the above step (1) can be carried out by connecting an electroconductive substrate, which is the article to be coated, to a cathode terminal and applying a load voltage of 100 to 400 V at a bath temperature of the above electrodeposition coating of 15 to 35° C.

The electrodeposited coat obtained in the above step (1), by heating in the step (2), undergoes layer separation due to the different solubility parameters of the respective resins and gives a cured electrodeposited film having a multilayer structure such that the layer formed from the particles A occurs on the side contacting with air directly and the layer formed from the particles B occurs on the side directly contacting with the article to be coated. The heating in the above step (2) is generally carried out at 140 to 200° C., preferably 160 to 180° C., for 10 to 30 minutes.

For improving the above layer separation property, preheating may be carried out following the above step (1). Although the above preheating may be conducted at the same temperature as of the heating in the above step (2), namely carried out successively with the above step (2), it is preferred in the practice of the invention that the preheating be conducted at a temperature below the curing temperature of the electrodeposition coating. By doing so, the layer separation property can be improved without deteriorating the coating film appearance. In that case, the heating temperature may be 60 to 130° C., and the heating time is about 1 to 10 minutes although it may vary according to the heating temperature, etc.

As for the method of heating in the above steps (1) and (2), the coated article may be placed in a heater adjusted beforehand to a desired temperature, or the temperature may be raised after placing the coated article in the heater.

The article to be coated is not particularly restricted but includes, for example, iron, copper, aluminum, tin, zinc and other metals; alloys and castings comprising these metals. Specifically, there may be mentioned bodies and parts of automobiles such as cars, trucks, motorcycles and buses. More preferably, these metals are subjected in advance to forming treatment with a phosphate salt, a chromate salt or the like prior to electrodeposition coating.

In the above electrodeposition coating, the resin (a) and resin (b) each occurs in an independently emulsified/dispersed state, so that the stability of the coating can be secured without any need for giving consideration to the compatibility between resin (a) and resin (b). If a polar functional group, for example an epoxy group, is introduced into the resin (a) to secure the compatibility between resin components, as described in Japanese Kokai Publication Hei-05-230402, Japanese Kokai Publication Hei-07-207196 and Japanese Kokai Publication Hei-09-208865, there will arise the problem that the elongation percentage and elasticity percentage of the coating films obtained decrease. On the contrary, the above electrodeposition coating does not require such modification but can provide the electrodeposited coating films with a high level of shock-absorbing performance characteristics.

Step (II)

In the step (II), a water-borne intermediate coating is applied onto the above electrodeposited coating film formed as mentioned above to thereby form an uncured intermediate coating film.

Water-Borne Intermediate Coating

The above water-borne intermediate coating contains an elastomer. The above elastomer contained therein can provide the intermediate coating film obtained with flexibility and improve the shock resistance and chipping resistance thereof. Furthermore, on the air-contacting side of the electrodeposited coating film, as mentioned above, the resin layer, which is close in physical properties to the above elastomer, is formed so that the adhesion between the electrodeposited coating film and intermediate coating film is improved and, as a result, the shock resistance and chipping resistance can be markedly improved.

The above elastomer is preferably designed so that a glass transition temperature thereof is −110° C. to 10° C. If it exceeds 10° C., the coating film obtained will become poor in flexibility or shock resistance. If it is below −110° C., it is practically difficult to prepare. More preferred is −100° C. to −10° C. The above designed glass transition temperature can be calculated from the formulating amounts of raw materials used in producing the above elastomer.

As the above elastomer, there may be mentioned those specifically mentioned hereinabove as the resin (a) referring to the above electrodeposition coating.

The above elastomer, when used in a form dispersed or dissolved in water, can be allowed to stably exist in the above water-borne intermediate coating. As regards the method of dispersion in water as mentioned above, the elastomer can be emulsified/dispersed in an aqueous medium, for example, by separately applying a dispersing resin, a surfactant or the like dispersants. Said emulsification/dispersion can also be carried out by introducing a functional group such as the above-mentioned reactive group or polar group into the elastomer to use the resulting products as they are or self-emulsifiable and dispersible in an aqueous medium by using a neutralizing agent.

When the above functional group is a cationic group such as an amine, the above neutralizing agent may be an inorganic acid such as hydrochloric acid, nitric acid or phosphoric acid; or an organic acid such as formic acid, acetic acid, lactic acid, sulfamic acid or acetylglycine acid. When the above functional group is an anionic group such as a carboxyl group, it may be an inorganic base such as ammonia; or a primary, secondary or tertiary amine acid salt or the like organic base of such as methylamine, dimethylamine, triethylamine, monoethanolamine, diethanolamine, N-methylethanolamine, triethylamine acid salt, N,N-dimethylethanolamine acid salt, morpholine or piperazine, etc.

As the above dispersing resin and surfactant, those conventionally used as dispersants can be used.

The above water-borne intermediate coating may contain another coating film-forming resin in addition to the above elastomer to control the physical properties of coating films obtained.

The above-mentioned other coating film-forming resin is not particularly restricted but includes, for example, acrylic resins, polyester resins, alkyd resins, epoxy resins and urethane resins and the like. From the viewpoint of pigment dispersibility or workability, acrylic resins and/or polyester resins are preferred.

The above-mentioned other coating film-forming resin preferably has a solid matter acid value of 20 to 100 mg KOH/g. When it is less than 20 mg KOH/g, insufficient curing of coating films may result. If it exceeds 100 mg KOH/g, the coating films obtained will be poor in water resistance. Preferred is 30 to 80 mg KOH/g.

The above other coating film-forming resin preferably has a hydroxyl value within the range of 30 to 150. If it is less than 30, insufficient curing of coating films may result and, if it exceeds 150, excess hydroxyl groups may remain in the coating films after curing, hence the water resistance tends to decrease.

Furthermore, the number average molecular weight is preferably within the range of 1,000 to 30,000. If it is less than 1,000, the physical properties, for example solvent resistance, of cured coating films will be poor. If it exceeds 30,000, the resin solution will have a high viscosity, so that not only it becomes difficult to handle the resin obtained in such operations as emulsification/dispersion but also the film appearance of the intermediate coating film obtained may be markedly impaired. Preferred is 2,000 to 20,000.

The above elastomers and other coating film-forming resins may be used each independently. For balancing the performance characteristics of coating films, however, two or more species may be used.

When it is necessary for the above elastomer to be cured in the step of coating film formation or when the above other coating film-forming resin is used, the above-mentioned water-borne intermediate coating generally contains a curing agent. The above curing agent is not particularly restricted but may be an amino resin and/or a blocked isocyanate resin, for instance. From the viewpoint of pigment dispersibility or workability, a melamine resin is preferred.

The content of the above elastomer based on the resin solids in the above water-borne intermediate coating is preferably 20 to 100% by weight on a solid basis. If it is less than 20% by weight, the coating films obtained will be poor in flexibility and chipping resistance. More preferred is 30 to 100% by weight. The resin solids referred above is the sum, on a solid basis, of the elastomer and the other coating film-forming resin and the curing agent which are optionally added.

The above water-borne intermediate coating generally contains a pigment.

As the above water-borne intermediate coating, those specifically mentioned hereinabove referring to the electrodeposition coating can be mentioned. For the purpose of improving the weathering resistance and securing the hiding power, color pigments are preferred. In particular, titanium dioxide is more preferred since it has a white color excellent in hiding power and is inexpensive.

It is also possible to prepare water-borne standard gray intermediate coatings by using, as the above pigments, carbon black and titanium dioxide as main pigments, to prepare water-borne set gray intermediate coatings by matching in lightness, hue or the like, with the top coating, or to prepare the so-called water-borne color intermediate coatings by using various color pigments in combination.

The above pigments are used preferably in an amount such that the ratio of the weight of the pigments relative to the total weight of the pigments and resin solids (PWC) amounts to 10 to 60% by weight in the above water-borne intermediate coating. At levels below 10% by weight, the pigment amount is insufficient, hence the hiding power may possibly decrease. At levels higher than 60% by weight, the pigment amount is excessive, causing an increase in viscosity in the step of curing, hence the flow characteristics will deteriorate and the coating film appearance may be impaired.

An appropriate amount of the above pigment can be incorporated in the step of water-borne intermediate coating preparation after preparing a pigment dispersion paste by preliminary dispersing the pigment by the aid of a pigment-dispersing resin in general use.

The above water-borne intermediate coating can be prepared by admixing the above pigment dispersion paste with the above elastomer and curing agent. Further, additive components such as ultraviolet absorbers, antioxidants, antifoaming agents, surface modifiers, foaming inhibitors and so forth may be added.

Intermediate Coating Film Forming Method

The above water-borne intermediate coating is applied onto the electrodeposited coating film formed on the article to be coated to thereby form an uncured intermediate coating film.

The method of applying the above water-borne intermediate coating is not particularly restricted. For example, the coating can be applied using an air electrostatic sprayer commonly called "React gun" or a rotary atomizer type electrostatic coater commonly called "micro micro ($\mu\mu$) bell", "micro ($\mu$) bell" or "meta bell" or the like. The method using a rotary atomizer type electrostatic coater is preferred.

The dry film thickness of the above intermediate coating film varies according to the intended use but preferably is 5 to 50 $\mu$m. If it exceeds the upper limit, the image sharpness may decrease and troubles may occur, for examples sagging in the step of application or foaming in the step of baking for curing. If it is less than the lower limit, the appearance may be impaired.

In the practice of the invention, to form uncured coating films using the water-borne intermediate coating, water-borne base coating and clear coating, respectively means that the intermediate coating, base coating and clear coating are applied in that order by the wet-on-wet manner. In this specification, the term "uncured" is used to also include, within the meaning thereof, the state after preheating, for instance. The step of above preheating comprises allowing the coating film after application to stand or heating the same at room temperature to a temperature lower than 100° C. for 1 to 10 minutes, for instance. For obtaining a better finish appearance, the preheating is preferably carried out after application of the water-borne intermediate coating and after application of the water-borne base coating.

Step (III)

In the above step (III), a water-borne base coating is applied onto the uncured intermediate coating film formed in the above manner to thereby form an uncured base coating film.

Water-Borne Base Coating

In the practice of the present invention, the water-borne base coating is not particularly restricted but may be composed of, for example, a coating film-forming resin, a curing agent, a pigment and other additives.

The above coating film-forming resin is not particularly restricted but includes, for example, acrylic resins, polyester resins, alkyd resins, epoxy resins and urethane resins. These are used in combination with a curing agent such as an amino resin and/or a blocked isocyanate resin. From the viewpoint of pigment dispersibility and workability, the combination of an acrylic resin and/or a polyester resin with a melamine resin is preferred.

The above water-borne base coating may be used also as a metallic base coating by incorporating a luster color pigment or as a solid-type base coating by incorporating a color pigment, for example red, blue or black, and/or an extender pigment, without incorporating any luster color pigment.

The above luster color pigment is not particularly restricted but includes, for example, metals, alloys and other colored or uncolored metallic lustering materials, and mixtures thereof, interfering mica powders, colored mica powders, white mica powders, graphite or colored or uncolored flat pigments. Colored or uncolored metallic lustering materials such as metals or alloys, and mixtures thereof are preferred since they are excellent in dispersibility and highly transparent coating films can be formed thereby. Specific examples of the metals are aluminum, aluminum oxide, copper, zinc, iron, nickel, tin and the like.

The above luster color pigment is not particularly restricted in shape. It may further be colored. For example, it preferably has a scale-like shape with a mean particle diameter ($D_{50}$) of 2 to 50 $\mu$m and a thickness of 0.1 to 5 $\mu$m. The one having a mean particle diameter within the range of 10 to 35 $\mu$m is more preferred since it is excellent in luster.

The pigment concentration (PWC) of the above luster color pigment in the base coating is generally not more than 23% by weight. If it exceeds 23% by weight, the coating film appearance will be impaired. Preferably, it is 0.01 to 20% by weight, more preferably 0.01 to 18% by weight.

Usable as the pigment other than the above luster color pigment are those color pigments and extender pigments mentioned hereinabove referring to the electrodeposition coating. One or a combination of two or more of the luster color pigments, color pigments and extender pigments can be used as the pigment mentioned above.

The pigment concentration (PWC) of all the pigments, inclusive of the above luster color pigments and other pigments, in the base coating is generally 0.1 to 50% by weight, preferably 0.5 to 40% by weight, more preferably 1 to 30% by weight. If it exceeds 50% by weight, the coating film appearance will be impaired.

As the other additives to be used in the above base coating and the method of preparing the base coating, there may respectively be mentioned those specifically mentioned hereinabove referring to the water-borne intermediate coating.

Base Coating Film Forming Method

The above base coating is applied onto the uncured intermediate coating film formed in the above-mentioned manner to thereby form an uncured base coating film.

As for the method of application mentioned above, those methods specifically mentioned referring to the application of the water-borne intermediate coating can be mentioned. In cases where the above base coating is applied to automotive bodies or the like, multistage coating, preferably two-stage coating, by air electrostatic spraying or the combination of air electrostatic spraying and the above-mentioned rotary atomizer type electrostatic coater is preferred since, then, the decorativeness can be improved.

The dry film thickness of the above base coating film varies according to the intended use but preferably is 5 to 35 $\mu$m. If it exceeds the upper limit, the image sharpness may decrease and troubles such as unevenness or running may occur in the step of application. If it is less than the lower limit, color unevenness may occur.

Step (IV)

In the above step (IV), a clear coating is applied onto the uncured base coating film formed in the above-mentioned manner to thereby form an uncured clear coating film.

Clear Coating

The clear coating film is formed for the purpose of smoothing the surface irregularities, twinkling or the like of the base coating film as caused by the luster color pigment when a luster color pigment-containing metallic base coating is used as the base coating and also for the purpose of protecting the base coating film.

The above clear coating is not particularly restricted but may be composed, for example, of a coating film-forming resin, a curing agent and other additives.

The above coating film-forming resin is not particularly restricted but includes, for example, acrylic resins, polyester resins, epoxy resins and urethane resins. These are used in combination with a curing agent such as an amino resin and/or a blocked isocyanate resin. From the viewpoint of transparency or acid etching resistance, the use of a combination of an acrylic resin and/or a polyester resin with an amino resin or the use of an acrylic resin and/or a polyester resin having a carboxylic acid-epoxy curing system is preferred.

The above clear coating, which is applied after the application of the above base coating while it is uncured, preferably contains a viscosity controlling agent as an additive for the purpose of preventing interlayer mingling or inversion or sagging. The level of addition of the above viscosity controlling agent is 0.01 to 10 parts by weight, preferably 0.02 to 8 parts by weight, more preferably 0.03 to 6 parts by weight, per 100 parts by weight of the resin solids in the clear coating. If it exceeds 10 parts by weight, the appearance will be impaired. If it is less than 0.1 part by weight, no viscosity controlling effect will be obtained, hence troubles such as sagging may be caused.

The coating form of the above clear coating may be any of an organic solvent-borne type, water-borne type (aqueous solution, aqueous dispersion, emulsion), non-aqueous dispersion type and powder type. If necessary, a curing catalyst, a surface modifier and the like may be used.

Clear Coating Film Forming Method

The above clear coating can be prepared and applied by following the conventional method.

The dry film thickness of the above clear coating film varies according to the intended use but preferably is 10 to 70 μm. If the dry film thickness exceeds the upper limit, the image sharpness may decrease and troubles such as unevenness or running may occur in the step of application and, if it is less than the lower limit, the appearance may be impaired.

Step (V)

In the above step (V), the above intermediate coating film, the above base coating film and the above clear coating film are simultaneously cured by heating to give a multilayer coating film.

The above curing by heating is carried out at a temperature of 110 to 180° C., preferably 120 to 160° C., whereby cured coating films with a high degree of crosslinking can be obtained. At above 180° C., the coating films will become hard and brittle and, at below 110° C., curing will be insufficient. While the curing time varies depending on the curing temperature, 10 to 60 minutes is appropriate in the case of curing at 120 to 160° C.

The multilayer coating films obtained by the method of forming a coating film according to the invention generally have a film thickness of 30 to 300 μm, preferably 50 to 250 μm. If it exceeds 300 μm, the film physical properties such as thermal shock resistance will decrease and, if it is less than 30 μm, the strength of the films themselves lowers.

The electrodeposition coating applied in the above step (I) constitutes a multilayer coating film and thus function division is realized, so that an electrodeposited coating film simultaneously having high levels of shock resistance (chipping resistance) and corrosion resistance as coating film performance characteristics can be obtained. Furthermore, since the intermediate coating applied in the above step (II) contains an elastomer, it can provide the intermediate coating film with flexibility to thereby improve the shock resistance and chipping resistance.

Therefore, multilayer coating films having good corrosion resistance and shock resistance (chipping resistance) and comparable in these properties to the coating films obtained by the prior art three-coat three-bake technique comprising curing by heating the conventional electrodeposition coating, intermediate coating and top coating each time after application of each coating can be obtained by the so-called three-wet coating comprising applying, onto the electrodeposited coating film obtained in the above-mentioned step (I), the intermediate coating, base coating and clear coating in the wet-on-wet manner in the above-mentioned steps (II) to (IV) and simultaneously baking these intermediate coating film, base coating film and clear coating film in the above-mentioned step (V). Furthermore, this three-wet coating makes it possible to omit, from the three-coat three-bake technique, that step of baking the intermediate coating which is conventional in the art and thus makes it possible to construct a novel coating system intended for process curtailment, cost reduction, energy saving and environmental load reduction.

In the step of coating film formation from the electrodeposition coating used in accordance with the invention, multilayer electrodeposited films can be obtained with a shock-absorbing layer formed on the electrodeposited coating film layer mainly functioning as a corrosion prevention. Furthermore, since the one containing an elastomer is used as the water-borne intermediate coating, the intermediate coating film can be provided with flexibility. Therefore, the multilayer coating films obtained in accordance with the invention have good corrosion resistance and shock resistance (chipping resistance) and are comparable in these respects to the conventional three-coat films.

The method of forming a multilayer coating film according to the invention plays an important role in the coating industry, in particular in the field of automobile coatings, in constructing a novel three-wet coating system for the purpose of curtailing the baking process, reducing the cost and reducing the environmental load (VOC and HAPs).

BEST MODE FOR CARRYING OUT THE INVENTION

The following specific examples illustrate the present invention in detail. They are, however, by no means limitative of the scope of the invention. "Part(s)" and "%" mean "part(s) by weight" and "% by weight", respectively.

PREPARATION EXAMPLE 1

Preparation of an Electrodeposition Coating 1-1 (Preparation of a Blocked Polyisocyanate Curing Agent)

A reaction vessel equipped with a stirrer, nitrogen inlet tube, condenser and thermometer was charged with 222 parts of isophoronediisocyanate and, after dilution with 50 parts of methyl isobutyl ketone, 0.2 part of butyltin laurate was added. After raising the temperature to 50° C., 17 parts of methyl ethyl ketoxime was added in a manner such that the temperature of the contents might not exceed 70° C. The mixture was maintained at 70° C. for 1 hour until substantial disappearance of the isocyanato residue-due absorption was confirmed on an infrared absorption spectrum. Dilution with 10 parts of n-butanol gave the desired blocked polyisocyanate (solubility parameter $\delta i=11.8$) with a solid content of 80%.

1-2 (Preparation of a Blocked Polyisocyanate Curing Agent)

A reaction vessel equipped with a stirrer, nitrogen inlet tube, condenser and thermometer was charged with 199 parts of hexamethylene diisocyanate trimer and, after dilution with 39 parts of methyl isobutyl ketone, 0.2 part of butyltin laurate was added. After raising the temperature to 50° C., 44 parts of methyl ethyl ketoxime and 87 parts of ethylene glycol mono-2-ethylhexyl ether were added in a manner such that the temperature of the contents might not exceed 70° C. The mixture was maintained at 70° C. for 1 hour until substantial disappearance of the isocyanato residue-due absorption was confirmed on an infrared absorption spectrum. Dilution with 43 parts of n-butanol gave the desired blocked polyisocyanate (solubility parameter $\delta i=10.7$) with a solid content of 80%.

1-3 (Preparation of a Cation-Modified Epoxy Resin Emulsion [Particles B])

A reaction vessel equipped with a stirrer, decanter, nitrogen inlet tube, thermometer and dropping funnel was charged with 2,400 parts of a bisphenol A-based epoxy resin (trademark: DER-331J; product of Dow Chemical) with an epoxy equivalent of 188, together with 141 parts of methanol, 168 parts of methyl isobutyl ketone and 0.5 part of dibutyltin dilaurate. The mixture was stirred at 40° C. until uniform dissolution, and 320 parts of 2,4-/2,6-tolylene diisocyanate (80/20 weight ratio mixture) was added dropwise over 30 minutes, whereupon heat was generated and the temperature rose to 70° C. Thereto was added 5 parts of N,N-dimethylbenzylamine, and the system inside temperature was raised to 120° C. and the reaction was allowed to proceed at 120° C. for 3 hours while distilling off the methanol, until the epoxy equivalent reached 500. Further, 644 parts of methyl isobutyl ketone, 341 parts of bisphenol A and 413 parts of 2-ethylhexanoic acid were added and, while maintaining the system inside temperature at 120° C., the reaction was allowed to proceed until the epoxy equivalent reached to 1,070, followed by cooling until the system inside temperature lowered to 110° C. Then, a mixture of 241 parts of diethylenetriamine diketimine (methyl isobutyl ketone solution with a solid content of 73%) and 192 parts of N-methylethanolamine was added and the reaction was allowed to proceed at 110° C. for 1 hour to give a cation-modified epoxy resin. This resin had a number average molecular weight of 2,100 and a hydroxyl value of 160. Upon infrared absorption spectroscopy and other measurements, the occurrence of an oxazolidone ring (absorption wave number: 1750 $cm^{-1}$) in the resin was confirmed. The solubility parameter was $\delta b=11.4$.

To the thus-obtained cation-modified epoxy resin were added 1,834 parts of the blocked polyisocyanate curing agent prepared in the above Preparation Example 1-1 (mixing ratio of the blocked polyisocyanate relative to 100 parts by weight of the cation-modified epoxy resin: 38% by weight), 90 parts of acetic acid and, further, 2 parts of zinc acetate and 2 parts of cerium acetate as a rust inhibitor. The mixture was diluted with deionized water to a nonvolatile matter content of 32% and then concentrated under reduced pressure to a nonvolatile matter content of 36%. An aqueous emulsion (hereinafter referred to as E1) comprising the cation-modified epoxy resin as the main component was thus obtained.

1-4 (Preparation of a Cationic Dispersant for Resin (a))

A reaction vessel equipped with a stirrer, condenser, decanter, nitrogen inlet tube and thermometer was charged with 114 parts of methyl isobutyl ketone and, after heating to 50° C., 75 parts of 4,4'-diphenylmethanediisocyanate and 0.1 part of dibutyltin dilaurate as a reaction catalyst were charged and the mixture was heated to and maintained at 50° C. in a nitrogen atmosphere. Further, 110 parts of R-15HT (1,4-polybutadiene-α,ω-diol, product of Idemitsu Petrochemical, number average molecular weight=1,200, hydroxyl value=103) was added dropwise from the dropping funnel over 30 minutes, followed by further 30 minutes of stirring. Then, 24 parts of N-methyldiethanolamine, 20 parts of ethylene glycol mono-2-ethylhexyl ether and 36 parts of a solution of diethylenetriamine diketimine in methyl isobutyl ketone (solid content 73%) were added, and the reaction was allowed to proceed at 80° C. for 30 minutes. Based on substantial disappearance of the absorption of the isocyanato group (wave number: 2220 $cm^{-1}$) on an IR chart for the contents, the reaction was confirmed to be complete. The resin solution obtained had a solid content of 70%, a number average molecular weight of 3,000 and an amine value of 85.

1-5 (Preparation of a Resin Emulsion [Particles A])

A vessel was charged with 70 parts of R-45HT (1,4-polybutadiene-α,ω-diol, product of Idemitsu Petrochemical, number average molecular weight=2,800, hydroxyl value= 47, butadiene content=99%, solubility parameter $\delta a=9.5$), 38 parts of the blocked polyisocyanate curing agent solution prepared in the above Preparation Example 1-2, 40 parts of the cationic dispersant prepared in Preparation Example 1-4 and 2.5 parts of acetic acid, the mixture was diluted with deionized water to a nonvolatile matter content of 32% and then concentrated under reduced pressure to a nonvolatile matter content of 36%. An aqueous emulsion (hereinafter referred to as E2) comprising the cation-modified resin as the main component was thus obtained.

1-6 (Preparation of a Pigment-Dispersing Resin)

A reaction vessel equipped with a stirrer, condenser, nitrogen inlet tube and thermometer was charged with 710 parts of a bisphenol A-based epoxy resin (trademark: Epon 829, product of Shell Chemical) with an epoxy equivalent of 198 and 289.6 parts of bisphenol A, and the reaction was allowed to proceed at 150 to 160° C. for 1 hour in a nitrogen atmosphere. Then, after cooling to 120° C., 406.4 parts of a solution of tolylene diisocyanate half-blocked with 2-ethylhexanol in methyl isobutyl ketone (solid content 95%) was added. The reaction mixture was maintained at 110 to 120° C. for 1 hour and then 1,584.1 parts of ethylene glycol mono-n-butyl ether was added. The mixture was cooled to 85 to 95° C. and homogenized.

In parallel to the preparation of the above reaction product, a separate reaction vessel was charged with 384 parts of a solution of tolylene diisocyanate half-blocked with 2-ethylhexanol in methyl isobutyl ketone (solid content 95%) and 104.6 parts of dimethylethanolamine, and the mixture was stirred at 80° C. for 1 hour. Then, 141.1 parts of a 75% aqueous solution of lactic acid was added, 47.0 parts of ethylene glycol mono-n-butyl ether was mixed in and the mixture was stirred for 30 minutes to give a quaternizing agent (solid content 85%). This quaternizing agent (620.46 parts) was added to the above reaction product, and the mixture was maintained at 85 to 95° C. until the acid value amounted to 1. A pigment-dispersing resin varnish (resin solid content 56%, average molecular weight 2,200) was thus obtained.

1-7 (Preparation of a Pigment Dispersion Paste)

Using a sand mill, a pigment paste was prepared according to the following formulation including the pigment-dispersing resin obtained in Preparation Example 1-6:

Pigment-Dispersing Resin Varnish of Preparation Example 1-6

| | |
|---|---|
| | 53.6 parts |
| Titanium dioxide | 88.0 parts |
| Carbon black | 2.0 parts |
| Aluminum phosphomolybdate | 10.0 parts |

1-8 (Preparation of an Electrodeposition Coating)

An electrodeposition coating (solid concentration 20%) was prepared using the cation-modified epoxy resin emulsion [particles B] (E1) obtained in Preparation Example 1-3, the resin emulsion [particles A] (E2) obtained in Preparation Example 1-5, the pigment dispersion paste 1 obtained in Preparation Example 1-7 and deionized water in respective amounts such that the mixing ratio resin (a)/resin (b) (on the resin solid ratio, without including the curing agent weight in calculation) amounted to 50/50 and the ratio of pigment/resin vehicle (total vehicle weight, including the curing agent weight) (P/V) amounted to 1/4.

In the above electrodeposition coating, an emulsion paste of dibutyltin oxide as a curing promoter was incorporated in an amount of 1.5% as tin amount relative to the amount of solids in the coating.

PREPARATION EXAMPLE 2

(Preparation of a Water-Borne Intermediate Coating)

2-1 (Preparation of a Water-Soluble Polyester Resin)

A reaction vessel was charged with 200.0 parts of isophthalic acid, 179.0 parts of phthalic anhydride, 176.0 parts of adipic acid, 150.0 parts of trimethylolpropane, 295.0 parts of neopentyl glycol and 2.0 parts of dibutyltin oxide, and the raw materials were melted by heating in a nitrogen gas flow and then the temperature was gradually raised to 170° C. with stirring. Then, dehydration and transesterification were effected while raising the temperature further to 220° C. over 3 hours. After the acid value became 10, the mixture was cooled to 150° C. Further, 114.0 parts of hexahydrophthalic acid was added and the reaction was allowed to proceed for 1 hour and then was finished. Further, after cooling to 100° C., 112.0 parts of butylcellosolve was added to give a polyester resin. The polyester resin obtained had a solid matter acid value of 50, a hydroxyl value of 65 and a number average molecular weight of 10,000 as determined by GPC.

The resin obtained was cooled to 60° C., and 80.0 parts of dimethylethanolamine and deionized water were added thereto to give a resin with a nonvolatile matter content of 50%.

2-2 (Preparation of a Color Pigment Paste)

The polyester resin obtained as mentioned above under 2-1 (50.0 parts), 17.9 parts of deionized water, 34.5 parts of rutile-form titanium dioxide, 34.4 parts of barium sulfate, 6 parts of talc and 0.1 part of carbon black were preliminarily mixed together and then mixed up and dispersed at room temperature for 1 hour in a paint conditioner with glass bead media added, to give a color pigment paste with a particle size not larger than 5 μm.

2-3 (Preparation of a Water-Borne Intermediate Coating)

A water-borne intermediate coating was prepared by formulating an elastomer, the color pigment paste, the water-soluble polyester resin mentioned above under 2-1 and a melamine resin (Cymel 235, product of Mitsui Cytec), as shown in Table 1. In Table 1, the elastomer used was Lacstar 3622A (product of Dainippon Ink & Chemicals; nonvolatile matter content 52.5% by weight; designed glass transition temperature −30° C.)

PREPARATION EXAMPLE 3

Preparation of a Water-Borne Base Coating 3-1 (Preparation of a Water-Soluble Acrylic Resin)

A reaction vessel was charged with 23.9 parts of dipropylene glycol methyl ether and 16.1 parts of propylene glycol methyl ether, and the temperature was raised to 120° C. with stirring in a nitrogen gas flow. Then, a mixed solution composed of 54.5 parts of ethyl acrylate, 12.5 parts of methyl methacrylate, 14.7 parts of 2-hydroxyethyl acrylate, 10.0 parts of styrene and 8.5 parts of methacrylic acid and an initiator solution composed of 10.0 parts of dipropylene glycol methyl ether and 2.0 parts of tert-butyl peroxy-2-ethylhexanoate were added dropwise in parallel to the reaction vessel over 3 hours. After completion of the dripping, maturation was effected at the same temperature for 0.5 hour. Further, an initiator solution composed of 5.0 parts of dipropylene glycol methyl ether and 0.3 part of tert-butyl peroxy-2-ethylhexanoate were added dropwise to the reaction vessel over 0.5 hour. After completion of the dripping, maturation was effected at the same temperature for 1 hour. Then, using a solvent-removing apparatus, 16.1 parts of the solvent was distilled off under reduced pressure (70 Torr) at 110° C., and then dimethylethanolamine and deionized water were added to give a water-soluble acrylic resin with a nonvolatile matter content of 31%, a solid matter acid value of 56 mgKOH/g and a hydroxyl value of 70.

3-2 (Preparation of a Color Pigment Paste)

A color pigment paste with a particle size of not larger than 5 μm was obtained by preliminarily mixing 100.0 parts of the above water-soluble acrylic resin, 28.9 parts of deionized water, 0.3 part of dimethylaminoethanol and 5.1 parts of Degussa Carbon FW-285 (Product of Degussa AG) together, followed by 1 hour of blending for effecting dispersion in a paint conditioner, with glass bead media added, at room temperature.

3-3 (Preparation of a Water-Borne Base Coating)

A water-borne base coating was prepared by formulating 134.3 parts of the above color paste, 118.8 parts of the water-soluble acrylic resin, 29.1 parts of a melamine resin (Cymel 204, product of Mitsui Cytec) and 161.3 parts of deionized water.

EXAMPLE 1

The electrodeposition coating obtained in Preparation Example 1 was applied by electrodeposition to zinc phosphate-treated dull steel panels at a voltage such that a dry film thickness of 30 μm was obtained. The coatings were first preheated at 100° C. for 5 minutes and then further baked at 160° C. for 15 minutes.

The water-borne intermediate coating obtained in Preparation Example 2 was applied to the above panels to a thickness of 20 μm by the air spray coating method, followed by 5 minutes of drying at 80° C. Then, the base coating obtained in Preparation Example 3 was applied thereto to a thickness of 18 μm by the air spray coating method, followed by 5 minutes of drying at 80° C. Furthermore, Macflow-O-1801 W Clear (clear coating produced by Nippon Paint) was applied thereto to a thickness of 35 μm by the air spray coating method, followed this time by 30 minutes baking at 140° C.

TABLE 1

|  | Example | | Compar. |
|---|---|---|---|
|  | 1 | 2 | Ex. 1 |
| Electrodeposition coating | Composition obtained in Prep. Ex. 1 | | U-50 |
| Intermediate coating | | | |
| Water-soluble polyester resin | 55.0 | 28.8 | Same as in Ex. 1 |
| Cymel 235 | 22.5 | 16.9 | |
| Color pigment paste | 142.9 | 142.9 | |
| Elastomer | 71.4 | 107.1 | |
| Deionized water | 20.7 | 16.9 | |
| Total | 312.5 | 312.6 | |
| Resin/elastomer solid ratio | 100/50 | 100/100 | |
| Nonvolatile matter | 60.0 | 60.0 | |
| PWC | 40 | 40 | |
| Chipping resistance test result | 5 | 5 | 3 |

(Evaluation Methods)

(1) Evaluation of the Electrodeposition Coating

The evaluation result of properties and performance characteristics of the respective electrodeposited coating films obtained are shown in Table 2.

In Table 2, the layer directly contacting air is referred as "upper layer" and the layer directly contacting the conductive substrate as "lower layer" for convenience' sake.

(1-1) Stability of the Coating

The electrodeposition coating was maintained at 30° C. and stirred for 1 month. Thereafter, one liter thereof was filtered through 400-mesh wire gauze. The residual solid matter on the wire gauze weighed less than 5 mg, the stability was judged as good.

(1-2) Layer Separation in the Electrodeposited Coating Film

The section was visually observed using a video microscope. In case a multilayer electrodeposited coating film was found, the main resin constituting each layer was identified by FTIR-ATR analysis.

(1-3) Thickness of Each Layer

The thickness was measured based on the results of the cross-section observation using the video microscope mentioned above.

(1-4) Elongation Percentage of the Upper Layer-Forming Resin

Specimens for tensile testing were separately prepared according to JIS K 6301 using the resin (a)-containing emulsion obtained in Preparation Example 1-5 and measured. The curing conditions were the same as the coating film curing conditions mentioned above.

(1-5) Tg (Dynamic Glass Transition Temperature) of the Upper Layer and of the Lower Layer A multilayer electrodeposited coating film formed on a tinplate was peeled off using mercury and cut to prepare specimens for measurements. The specimens were once frozen using liquid nitrogen on a Rheometrics dynamic analyzer RDA-II tester (product of Rheometrics, USA) and then given vibrations with a frequency of 10 Hz at a rate of temperature rising of 2° C. per minute and measured for viscoelasticity. The ratio (tan δ) of the loss elastic modulus (E") relative to the storage elastic modulus (E') was calculated and each dynamic Tg was determined by determining the point of inflexion thereof.

(1-6) Electrodeposited Film Surface Roughness

The coated panel obtained was measured for surface roughness Ra according to JIS B 0601 using Handy Surf E-30A (product of Tokyo Seimitsu) (cutoff 0.8 mm).

(1-7) SDT

The coated panel was given cross cuts reaching the substrate by means of a knife and subjected to salt solution immersion testing (5% aqueous solution of sodium chloride, 55° C.) for 240 hours and peeling was attempted from both sides of the cut area using an adhesive tape. The maximum width of the portion peeled off was indicated.

(1-8) SST

The coated panel was given cross cuts reaching the substrate by means of a knife and subjected to salt spray testing (5% aqueous solution of sodium chloride) for 240 hours. The maximum width of rust gathering from the cross-cut portion was indicated.

(1-9) Shock Resistance

Using a DuPont impact tester, a weight of 1 kg was allowed to fall upon the panel from a height of 50 cm at room temperature and the panel was examined for coating filmbreaking and peeling.

TABLE 2

| Electrodeposition coating | Preparation Example 1 | U-50 |
|---|---|---|
| Stability of the coating | Good | Good |
| Electrodeposited film section observation | Separation into two layers | Unilayer structure |
| Layer thickness A (μm) | 15 | — |

TABLE 2-continued

| Electrodeposition coating | Preparation Example 1 | U-50 |
|---|---|---|
| Layer thickness B (μm) | 15 | — |
| Elongation (%) of upper layer-forming resin | 800 | — |
| Tg (° C.) of upper layer | −50 | — |
| Tg (° C.) of lower layer | 90 | — |
| Electrodeposited film surface roughness Ra | 0.15 | 0.15 |
| SDT | 0.1 mm | 0.1 mm |
| SST | 1.0 mm | 1.0 rum |
| Shock resistance | No breaking, no peeling | Breaking and peeling |

(2) Evaluation of the Multilayer Coating Films Obtained
(2-1) Chipping Resistance The coated panel cooled to −30° C. was mounted on the specimen holder of a flying stone testing machine (product of Suga Shikenki) so that the stone might collide with the panel at an angle of 90°. The No. 7 crushed stone weighing 100 g was shot at an air pressure of 3 kg/cm² and caused to collide with the coated panel. The extent of chipping (number, size, site of breakage) was evaluated on the 5-score scale. The results are shown in Table 1.

1: Chipping all over the surface, peeling from the substrate.
2: Chipping all over the surface, no peeling from the substrate.
3: Partial chipping, peeling from the substrate.
4: Partial chipping, no peeling from the substrate.
5: Substantially no breakage.

EXAMPLE 2

Coated panels with a multilayer coating film formed thereon were produced and evaluated in the same manner as in Example 1 except that the water-borne intermediate coating was prepared according to the formulation indicated in Table 1. The results are shown in Table 1.

COMPARATIVE EXAMPLE 1

Coated panels with a multilayer coating film formed thereon were produced and evaluated in the same manner as in Example 1 except that Powertop U-50 (cationic electrodeposition coating, product of Nippon Paint) was used as the electrodeposition coating. The results are shown in Table 1 and Table 2.

As shown in Table 2, it was found that while the conventional electrodeposition coating forms a single-layer coating film, the electrodeposition coatings to be used according to the invention form multilayer electrodeposited coating films of high resin elongation percentage, with the lower layer having a higher Tg and the upper layer having a lower Tg. As is seen from Table 1, it was found that the multilayer coating films obtained in Examples are superior in chipping resistance.

What is claimed is:

1. A method of forming a multilayer coating film comprising
the step (I) of coating an article to be coated with an electrodeposition coating followed by curing by heating to form an electrodeposited coating film,
the step (II) of applying a water-borne intermediate coating onto said electrodeposited coating film to form an uncured intermediate coating film,
the step (III) of applying a water-borne base coating onto said intermediate coating film to form an uncured base coating film, the step (IV) of applying a clear coating onto said base coating film to form an uncured clear coating film and the step (V) of curing said intermediate coating film, said base coating film and said clear coating film simultaneously by heating to thereby obtain a multilayer coating film, wherein said electrodeposition coating contains a particle A containing a resin (a) whose solubility parameter is $\delta a$ as well as a particle B containing a curing agent and a resin (b) whose solubility parameter is $\delta b$ and satisfies that (1) the value of ($\delta b - \delta a$) is not less than 1.0, (2) as regards the electrodeposited coating film formed from said electrodeposition coating, a resin film formed from said particle A shows a dynamic glass transition temperature of −110 to 10° C. and the resin film obtained by film formation from said particle A alone shows an elongation percentage of not less than 200% and (3) as regards the electrodeposited coating film formed from said electrodeposition coating, a resin film formed from said particle B shows a dynamic glass transition temperature of 60 to 150° C., and wherein said water-borne intermediate coating contains an elastomer.

2. The method of forming a multilayer coating film according to claim 1, wherein the particle A contains a curing agent and solubility parameter $\delta i$ of at least one of said curing agent satisfies $\delta b > \delta i > \delta a$.

3. The method of forming a multilayer coating film according to claim 1, wherein the weight ratio between the resin (a) and the resin (b) on the solid basis is 5/95 to 70/30.

4. The method of forming a multilayer coating film according to claim 1, wherein the resin (a) is obtained by polymerization of a monomer component comprising at least 50% by weight of a conjugated diene monomer.

5. The method of forming a multilayer coating film according to claim 1, wherein the elastomer in the water-borne intermediate coating is dispersed or soluble in water.

6. The method of forming a multilayer coating film according to claim 1, wherein the content of the elastomer is 20 to 100% by weight, on the solid basis, relative to the resin solids in the water-borne intermediate coating.

* * * * *